United States Patent
Boyum et al.

(10) Patent No.: US 7,613,937 B2
(45) Date of Patent: Nov. 3, 2009

(54) METHOD AND APPARATUS FOR UTILIZING A MICROCONTROLLER TO PROVIDE AN AUTOMATIC ORDER AND TIMING POWER AND RESET SEQUENCER

(75) Inventors: Kevin Boyum, Roseville, CA (US);
Robert Dobbs, Roseville, CA (US);
Kenneth Duisenberg, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 344 days.

(21) Appl. No.: 11/263,433

(22) Filed: Oct. 31, 2005

(65) Prior Publication Data

US 2007/0101166 A1     May 3, 2007

(51) Int. Cl.
G06F 1/00      (2006.01)
G06F 15/177    (2006.01)
G06F 9/24      (2006.01)
G06F 1/26      (2006.01)

(52) U.S. Cl. ............... 713/300; 713/330; 713/1; 713/100

(58) Field of Classification Search ............... 713/300, 713/330, 1, 100
See application file for complete search history.

(56) References Cited

U.S. PATENT DOCUMENTS

| | | | |
|---|---|---|---|
| 6,237,103 B1 * | 5/2001 | Lam et al. ............... | 713/330 |
| 6,404,246 B1 * | 6/2002 | Estakhri et al. ............. | 327/156 |
| 6,429,706 B1 * | 8/2002 | Amin et al. ............... | 327/143 |
| 6,850,048 B2 * | 2/2005 | Orr et al. ................. | 323/299 |
| 6,963,340 B1 * | 11/2005 | Alben et al. .............. | 345/501 |
| 7,080,264 B2 * | 7/2006 | Mahony et al. ............ | 713/300 |
| 7,080,273 B2 * | 7/2006 | Brown et al. .............. | 713/330 |
| 7,281,150 B1 * | 10/2007 | Strickland ................. | 713/330 |
| 7,321,976 B2 * | 1/2008 | Hasegawa ................. | 713/330 |
| 2004/0095116 A1 * | 5/2004 | Kernahan et al. ........... | 323/282 |
| 2005/0223259 A1 * | 10/2005 | Lehwalder et al. ......... | 713/330 |

* cited by examiner

*Primary Examiner*—Ji H Bae (57) ABSTRACT

Embodiments of the invention provide a method and an apparatus for utilizing a microcontroller to provide an automatic order and timing power and reset sequencer. A first inter-integrated circuit (I2C) register table containing a modifiable system power-up sequence is accessed. An automatic system power-up operation is then performed in the order of the power-up sequence defined by the first I2C register table.

23 Claims, 5 Drawing Sheets

Physical Arrangement 400

| Pin | Label | Description |
|---|---|---|
| 1 | VMAIN_CHK | Analog input used to see if external voltage is present |
| 2 | PWR_BTN | Input from power button |
| 3 | SB_DONE | Input from FPGA indicating that it has been programmed |
| 4 | AUTO_PWR_UP | Input that if high when the PRS is initialized, the PRS will auto-initiate the sequence after a programmable period of time |
| 5 | SEQ_OUT_27 / SYN_RST | Open-collector output to reset the clock synthesizer |
| 6 | SEQ_OUT_25 / SYN_EN | Open-collector output to enable the clock synthesizer |
| 7 | SEQ_OUT_23 / SYN_DATA | Open-collector output to program the clock synthesizer |
| 8 | SEQ_OUT_21 / SYN_CLK | Open-collector output to clock the data into the clock synthesizer |
| 9 | SEQ_OUT_15 | Sequenced Output pin |
| 10 | SEQ_OUT_13 | Sequenced Output pin |
| 11 | SEQ_OUT_11 | Sequenced Output pin |
| 12 | SEQ_OUT_9 | Sequenced Output pin |
| 13 | SMP | No connect |
| 14 | SEQ_OUT_7 | Sequenced Output pin |
| 15 | SEQ_OUT_5 | Sequenced Output pin |
| 16 | SEQ_OUT_3 | Sequenced Output pin |
| 17 | SEQ_OUT_1 | Sequenced Output pin |
| 18 | SEQ_OUT_19 | Sequenced Output pin |
| 19 | SEQ_OUT_17 | Sequenced Output pin |
| 20 | I2CHW_1SCL | I2C Clock |
| 21 | I2CHW_1SDA | I2C Data |
| 22 | PWR_BTN_CLK | Output 1Hz clock for power button latch |
| 23 | SPARE_IN_3 | |
| 24 | VSS | |
| 25 | SPARE_IN_2 | |
| 26 | SPARE_OUT_0 | |
| 27 | SEQ_MPON | Output indicates that sequence is complete (1) or in progress (0) |
| 28 | SEQ_STATUS | Output indicates the success of the sequence operation (1=success) |
| 29 | SEQ_OUT_16 | Sequenced Output pin |
| 30 | SEQ_OUT_18 | Sequenced Output pin |
| 31 | SEQ_OUT_0 | Sequenced Output pin |
| 32 | SEQ_OUT_2 | Sequenced Output pin |
| 33 | SEQ_OUT_4 | Sequenced Output pin |
| 34 | SEQ_OUT_6 | Sequenced Output pin |
| 35 | XRES | External reset pin. Use for the programming header if installed, otherwise it can float. |
| 36 | SEQ_OUT_8 | Sequenced Output pin |
| 37 | SEQ_OUT_10 | Sequenced Output pin |
| 38 | SEQ_OUT_12 | Sequenced Output pin |
| 39 | SEQ_OUT_14 | Sequenced Output pin |
| 40 | SEQ_OUT_20 | Sequenced Output pin (used as PLL_RESET_L in RuSa) |
| 41 | SEQ_OUT_22 | Sequenced Output pin |
| 42 | SEQ_OUT_24 | Sequenced Output pin |
| 43 | SEQ_OUT_26 / SYN_LOAD | Output to load data into the clock synthesizer |
| 44 | NORM_MODE | Input to modify sequence |
| 45 | BMC_PWR_CMD | Input to allow manageability to initiate the sequence |
| 46 | SYN_READ | Input to read back data from the clock synthesizer |
| 47 | SPARE_IN_0 | |
| 48 | VDD | |

FIG. 4

Firmware Interface 500

| | | |
|---|---|---|
| Read-only Status Registers 510 | | |
| 0x00 | Signature | Constant signature "P", "R", "S" |
| 0x03 | Firmware Revision | Bit definition: Major rev bits[7:4], min or rev bits [3:0], in hex format. Contents should be interpreted as decimal (e.g. 0x3b is rev 3.11). |
| 0x04 | Progress/Failure | Indicates the sequence step last successfully completed |
| Writeable Sequence Registers 520 | | |
| 0x05 | Sequence ID | Bit definition: Major rev bits[7:4], minor rev bits in hex format. Contents should be interpreted as decimal (e.g. 0x3b is rev 3.11). |
| 0x06 | Delay Time 1 | Defined herein |
| 0x07 | Action Type 1 | Defined herein |
| 0x08 | Action Index 1 | Defined herein |
| 0x09 - 0x7D | Sequence Steps 2-40 | Note: each step is 3 bytes in length |
| Writeable Sequence-Down Registers 530 | | |
| 0x7E | Sequence ID | Bit definition: Major rev bits[7:4], min or rev bits [3:0], in hex format. Contents should be interpreted as decimal (e.g. 0x3b is rev 3.11). |
| 0x7F | Delay Time 1 | Defined herein |
| 0x80 | Action Type 1 | Defined herein |
| 0x81 | Action Index 1 | Defined herein |
| 0x82 - 0xEA | Sequence-down Steps 2-36 | Note: each step is 3 bytes in length |
| Writeable Configuration Registers 540 | | |
| 0xEB | General Config | See bit definition below |
| 0xEC | Auto Power-Up Delay | Delay (in seconds) until system is automatically powered on |
| 0xED 0xEE | Clock Synth Settings | Bit definition: Reserved [15:14], Invalid [13], 'N' Divider [12:10], 'M' Divider [9:1], SpreadSpectrumClocking[0] |
| 0xEF | Reserved | |
| 0xF0 0xF1 | Store Sequence | Writing 0xa55a to this location causes all the writeable registers to be stored in internal flash memory |
| Debug Registers 550 | | |
| 0xF2 | Command | Allows I2C initiation of sequencing, bypassing of checks, etc. |
| 0xF3 - 0xFA | Reserved | |
| Firmware Update Registers 560 | | |
| 0xFB | Bootloader Mode | Defined herein |
| 0xFC | Bootloader Command | Defined herein |
| 0xFD | Key 1 | Defined herein |
| 0xFE | Key 2 | Defined herein |
| 0xFF | Status Byte | Bootloader Status (defined herein) |

FIG. 5

METHOD AND APPARATUS FOR UTILIZING A MICROCONTROLLER TO PROVIDE AN AUTOMATIC ORDER AND TIMING POWER AND RESET SEQUENCER

TECHNICAL FIELD

The present invention generally relates to system power-up/power-down sequences. More specifically to a system and method for utilizing a microcontroller to provide an automatic order and timing power and reset sequencer.

BACKGROUND ART

Presently, computing systems are turned on utilizing two methods. The first method is to power up each component of the system at the same time. The second method is to power up each component of the system in a particular order. If the components of the system are powered up all at the same time, then no particular device is needed during power up or powering down of the system. Instead, a single on/off switch is utilized to provide or remove power to the system.

However, as systems become more complex and include a plurality of voltage rails or other components with reset or enable signal capabilities, the order in which components are turned on becomes an integral system operation. For example, if the components are not turned on in the proper order, errors and total system failures can occur. In some cases, the system failures will require technical support, replacement of hardware, loss of operational time, significant costs, and the like. In general, to ensure that the system is powered on in the correct order, a system will include a power and/or reset sequencer for performing the correct powering-up and powering-down sequence of the components within the system.

Presently, hardware devices such as logic gates and the like are used to turn on each component in a system in a cascade fashion. For example, when the power switch is initiated, primary power is turned on. Then, after the primary power is on, the next component in the system to be powered up, e.g., a secondary converter is then activated. The process continues in the hardware defined fashion until all the components are turned on. However, hardware device power on initiation has significant drawbacks. The first is that there is little or no timing control between component activation. Therefore, if a delay is needed between component activation, e.g., for confirmation purposes and the like, it is not available in the hardware device power-on setup.

A second drawback to hardware device sequencing is realized when a modification to the system power-up or power down process is needed. For example, if it is realized that a system needs to power up components in a different order, the entire hardware device will have to be replaced or physically modified to produce the desired system power up power down reorder. This procedure is both time and cost intensive.

One method for overcoming the hardware device sequencing is to utilize a baseboard management controller to perform the system power up/power down sequence. In general, the management controller is a complex processor with a real time operating system (O/S). Thus, the use of the management controller for the power up/power down process is overkill. Moreover, the management controller is complex and has many non-critical jobs. By adding an additional job to the controller, the opportunity for management controller bugs or failure is increased. Additionally, if the controller fails due to a non-system critical fault, the system will still be critically compromised.

For example, the power up/down process could be deleteriously affected by a simple failure or error in the management subsystem which would not otherwise be a critical failure to the system. For example, a failure in a non-user activated process, e.g., a manager utilized user transparent system health monitoring program, could result in a system-wide failure requiring significant technical assistance. In other words, normally the error in the monitoring program would not result in any other system compromise, but due to the management controller performing the critical system power up/down function, the entire system will be subjected to critical system failure due to failure of a non-critical component.

DISCLOSURE OF THE INVENTION

Embodiments of the invention provide a method and an apparatus for utilizing a microcontroller to provide an automatic order and timing power and reset sequencer. A first inter-integrated circuit (I2C) register table containing a modifiable system power-up sequence is accessed. An automatic system power-up operation is then performed in the order of the power-up sequence defined by the first I2C register table.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

FIG. 4 is an exemplary physical arrangement of the I2C bootloader framework that allows the firmware of the PRS to be updated over the I2C bus interface in accordance with one embodiment of the present invention.

FIG. 5 is an exemplary firmware interface table provided as a protocol for communicating with the PRS I2C slave device in accordance with one embodiment of the present invention.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor. RAM, ROM and a data storage device are exam Dies of computer-readable storage devices and instructions stored on the RAM, ROM and data storage device are examples of computer-readable program code.

Overview

Embodiments provide an automated method and apparatus for utilizing a microcontroller to provide an automatic order and timing power and reset sequencer. Embodiments further provide a power and reset sequencer (PRS) that is capable of controlling enable signals, a clock synthesizer and a reset control. The power-on/off (or up/down) order, electrical value and time delay of the signals are specified in an internal table which is modifiable over an inter-integrated circuit (I2C) interface.

Prior to the invention, power or reset sequencer hardware in a system is normally only able to follow a single turn-on sequence. Modifying the order of the turn on/off sequence is not possible without significant replacement of parts. The prior software power or reset sequencer method utilizes a management controller that is normally not a critical component with a plurality of jobs other than the power or reset sequencer duties. The PRS described herein utilizes a microcontroller design specifically assigned the PRS task. The microcontroller allows the order and timing of the signals to be changed programmatically and without the need to replace the microcontroller device if the sequence changes. This is especially important during the bring-up phase of a product, when the turn-on timing is still being defined. However, the programmable microcontroller also allows the order to be changed throughout the life of the product.

Figure 1:
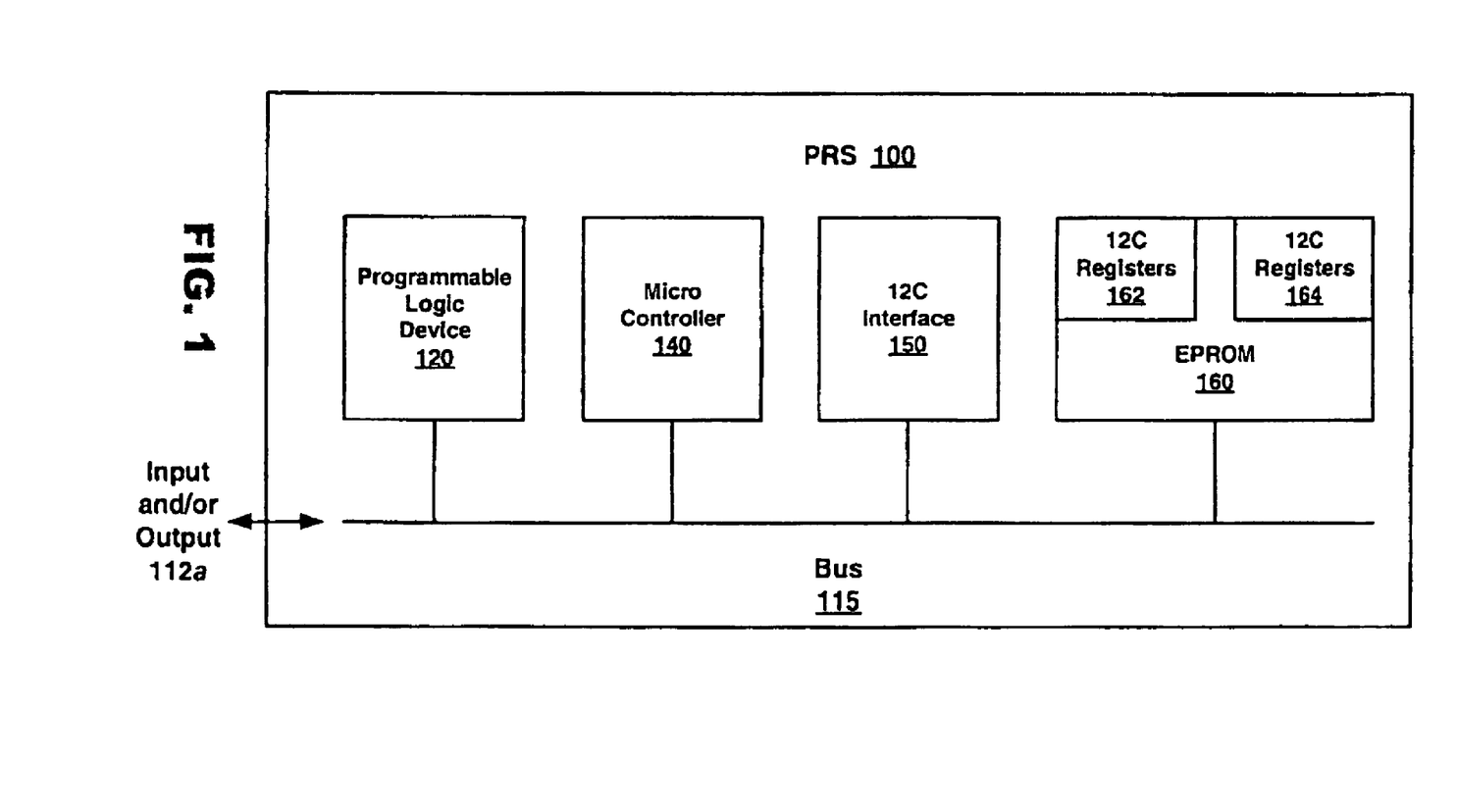
FIG. 1 is a block diagram of a power reset sequence microcontroller circuit shown in accordance with an embodiment of the present invention.

With reference now to FIG. 1, a block diagram of a power reset sequence PRS 100 is shown in accordance with an embodiment of the present invention. The circuit 100 generally comprises a programmable logic device 120, a microcontroller 140, an I2C interface 150 coupled with the microcontroller 140 and an erasable programmable read-only memory (EPROM) 160. In one embodiment, the programmable device 120 has an input and/or output 112a that receives or sends signals from external devices. The programmable device 120 also has an input/output to receive control information from the microcontroller 140 via the bus 115.

The microcontroller 140 includes a multi-bit input that will receive data signals from the output of the programmable device 120 via bus 115. The microcontroller 140 also presents address information to the EPROM 160 via bus 115. Additionally, the EPROM 160 will present data information to an input of the microcontroller 140 via bus 115. In general, the EPROM 160 is implemented as any of a variety of non-volatile memories including an EPROM, an electrically EPROM (EEPROM), a flash memory, etc. In one embodiment, the EPROM 160 also includes a first I2C register table 162 containing a modifiable system power-up sequence and a second I2C register table 164 containing a modifiable system power-down sequence. In one embodiment, the I2C interface 150 is a portion of the microcontroller 140 utilized to access the first or second I2C register tables and perform the power up/down sequence associated therewith. If the programmable device 120, the microcontroller 140 and the EPROM 160 are fabricated as a single circuit 100, the overall device area needed to implement a particular application requiring the particular elements of each component may be reduced by combining one or more processing steps common to each device.

Figure 2:
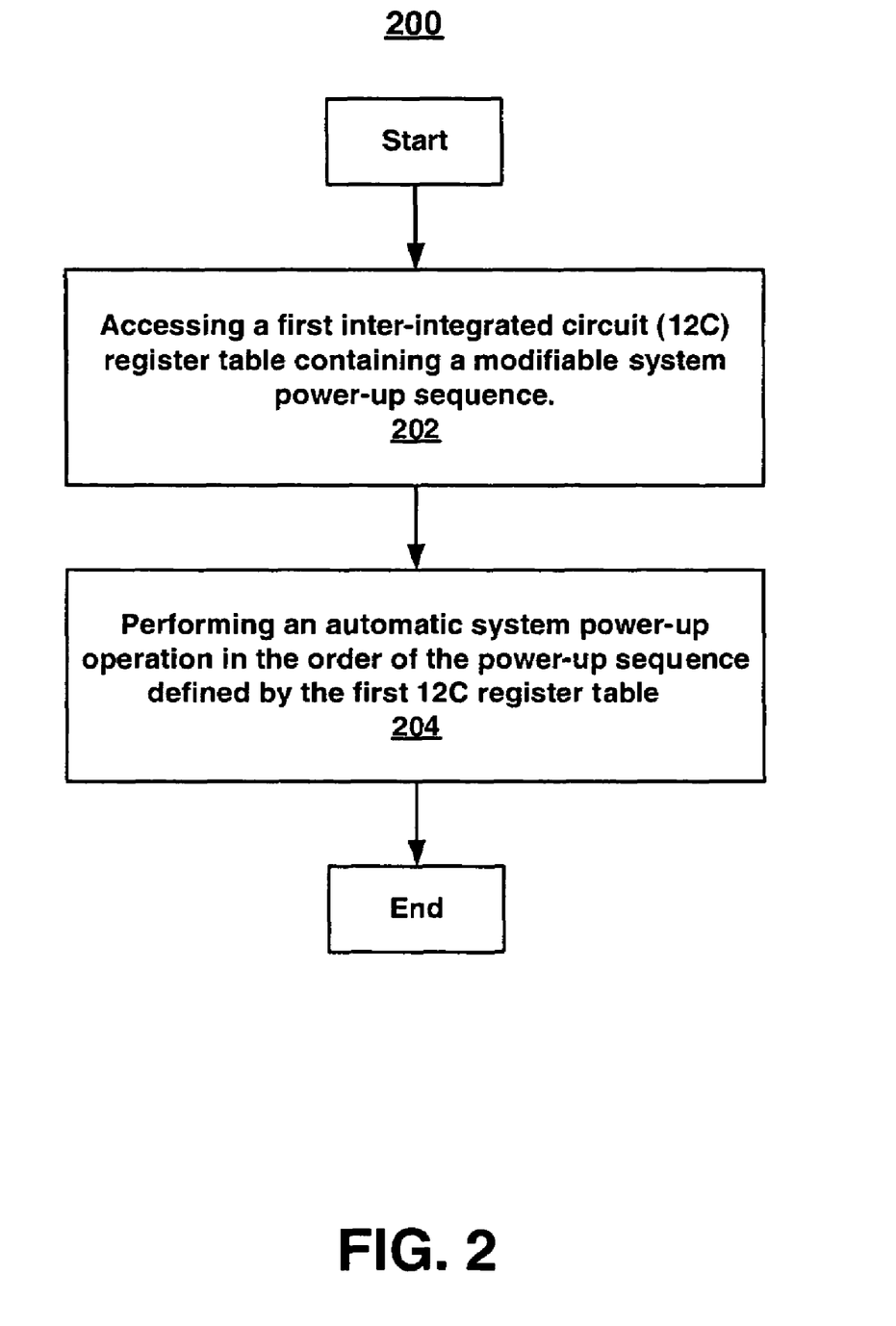
FIG. 2 is a high level flowchart of an exemplary method for utilizing a microcontroller to provide an automatic order and timing power and reset sequencer in accordance with one embodiment of the present invention.

With reference now to FIG. 2, a flowchart of an exemplary method for utilizing a microcontroller to provide an automatic order and timing power and reset sequencer is provided in accordance with one embodiment of the present invention. In general, the PRS is designed to provide simple, reliable, deterministic sequencing of the system power, reset, and clocking subsystems, including the programming of the system clock synthesizer. Based on a PRS 100 with on-board flash storage 160, this device can perform the sequencing and programming operations without outside intervention from the manageability subsystem. The I2C interface 150 and discrete signals do, however, allow the manageability subsystem to interact with the sequencer to initiate, alter, and save new sequences (e.g., 162 and 164), as well as to update the entire firmware image of the sequencer if necessary. Additionally, the PRS clock synthesizer update provides support for a plurality of other circuit components which need programming after power-up and before a system reset is released. For example, programmable delay lines, voltage trip points, divider circuits, volatile control bits in registers, and work-a-rounds for very large scale integration (VLSI) bugs.

With reference now to 202 of FIG. 2 and to FIG. 1, one embodiment accesses a first I2C register table 162 containing a modifiable system power-up sequence. In one embodiment, the I2C register table is stored in an EPROM 160 such as a flash memory. By storing the I2C register table 162 in an EPROM 160, a system power-up sequence update capability is available to the first I2C register table 162. That is, the first I2C register 162 is updateable via standard I2C access methods.

Moreover, the I2C register table 162 may include a component by component sequence for a plurality of components in the system. In addition, the I2C register table 162 will, in one embodiment, provide a delay between at least one of the plurality of components in the sequence. Furthermore, in one embodiment, the I2C register table 162 will provide a clock synthesizer update for updating a clock synthesizer during the power-up sequence.

Referring now to 204 of FIG. 2 and FIG. 1, one embodiment performs an automatic system power-up operation in the sequence defined by the first I2C register table 162. In another embodiment, the PRS also includes a second I2C register table 164 that provides a power-down sequence. While the sequence between the first I2C table 162 and the second I2C table 164 may be different, and not just reversed, the operation of the PRS is similar in both the power up and power down sequences. Therefore, only a power-up example is described herein for purposes of brevity and clarity. One example of the power-up sequence is provided in Flowchart 300. In another embodiment, an I2C interface 150 coupled the PRS 100 is utilized to perform an automatic system power-up operation in the sequence defined by the first I2C register table 162. In yet another embodiment, an I2C interface 150 coupled the PRS 100 is utilized to perform an automatic system power-down operation in the sequence defined by the second I2C register table 164.

Figure 3:
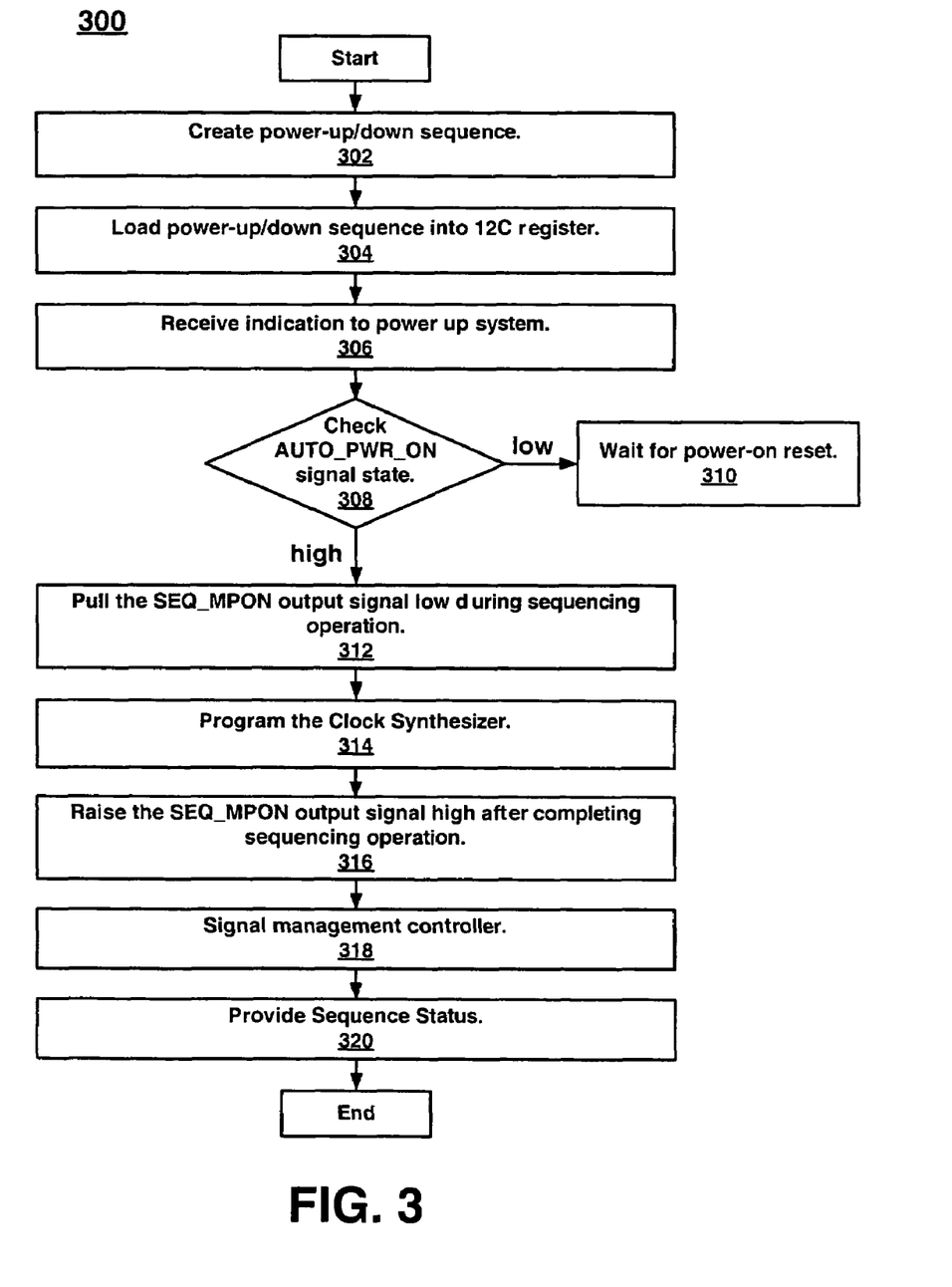
FIG. 3 is a flowchart of one exemplary method for powering up a system utilizing the power and reset sequencer in accordance with one embodiment of the present invention.

With reference now to FIG. 3, a flowchart of one exemplary method for powering up a system utilizing the power and reset sequencer is shown in accordance with one embodiment of the present invention.

Referring now to 302 of FIG. 3, one embodiment creates a power-up sequence. In another embodiment, a power-down sequence is also created. That is, before the PRS can perform its role as a sequencer, a sequence must be loaded into the part by writing to a series of I2C accessible registers (defined in the Firmware Interface section below). This sequence, which is identified by a Sequence ID, declares the delay time before each sequence step is performed and the action to be performed at each sequence step.

The available sequence step actions include changing the state of a sequence output pin, performing a function (such as programming the system clock synthesizer), or adding more delay between sequence steps. Functions are unique in that they can include a feedback check before returning (versus being open loop like changing the state of an output pin or adding delay). For example, the clock programming function will program the clock and then read back the programmed value from the clock synthesizer to ensure that it programmed correctly. Functions are also unique in that they must be pre-programmed into the PRS firmware, and are then called in the sequence. To add a new function, the PRS code itself must be updated (versus just changing the sequence). Finally, functions are unique in that a parameter may be passed in to the function via the delay time register.

With reference now to 304 of FIG. 3, one embodiment loads the power-up/down sequence(s) into the registers. In one embodiment, due to component limitations, the power-up sequence may contain up to 40 sequence steps. This sequence may be stored into the internal flash 160 of the PRS 100. In one embodiment, the sequence is stored by writing a specific keyword to a StoreSequence register. However, as component limitations expand, the number of sequence steps will be able to be increased.

In one embodiment, prior to sequencing, the sequence output pins are placed in the Hi-Z state and during sequencing the PRS depends on external pull-up or pull-down resistors to keep the not yet sequenced signals in their default state. Alternatively, a power-down sequence can be executed prior to the power-up sequence to put all the pins into an initial safe state (such as strong low or high).

Referring now to 306, one embodiment receives the indication to power up the system. For example, with the sequence in place, the PRS 100 waits for an indication to power up the system. The two primary power-up contributors are the power button input pin (PWR_BTN) and the power command input pin (BMC_PWR_CMD). For example, a momentary (less than 4 second) high pulse on the power button input pin or a 50 ms or greater pulse on the power command input pin causes the sequencer to begin its power-up sequence.

With reference now to 308, one embodiment checks to ensure that the AUTO_PWR_ON signal is in the electrically high state when the PRS 100 comes out of a power-on reset, then the PRS 100 will automatically initiate a power-up sequence 312 after a programmable period of time. If the PRS is reset for any other reason, or if this signal is asserted high after the programmable period of time, then the PRS will not act on it until the PRS again comes out of a power-on reset.

Referring now to 312, in one embodiment, e.g., during the sequencing operations, the PRS pulls the SEQ_MPON output signal low. In addition, the sequence of power up steps is performed on the components within the system. For example, in one embodiment, the first step in the sequence includes turning on the bulk power. The system is then checked to ensure the bulk power came up, e.g., a delay is utilized. Once the bulk power is up, a secondary converter may be enabled to reduce the voltage from 12 volts to 3.3 volts. Additional components and delays are then worked through until each of the components in the sequence is powered up.

With reference now to 314, one embodiment programs the clock synthesizer. For example, to correctly program the clock synthesizer, the programming data ('M', 'N', and 'SSC') is loaded into the Clock Synth Settings register (defined in the Firmware Interface section below) using the I2C interface. The Program Clock Synthesizer function writes these values to the clock synthesizer, and then reads the values back from the synthesizer to verify the programming was successful.

If there is a mismatch the original values in the Clock Synth Settings register are replaced with those actually read back from the synthesizer, the Invalid bit in that register is set to a 1, the SEQ_STATUS signal is set low, and the sequence step corresponding to the clock programming function is not stored in the progress/failure register. In one embodiment, re-programming the clock after a mismatch requires writing the desired values to the Clock Synth Settings register again, which also clears the Invalid bit.

With reference now to 316, in one embodiment, when the PRS has completed the sequencing operations, it releases the SEQ_MPON output signal. In addition, in 318 the management controller is signaled and in 320 the sequence status is provided to the management controller. For example, if the sequencing operation completed successfully it leaves the SEQ_STATUS signal high. If an error was detected during the sequencing operations then the SEQ_STATUS is pulled low and the index of the sequence step that first failed is logged in the Progress/Failure register. In one embodiment, SEQ_STATUS will remain low until the next power-up or power-down indication is received.

As described herein, a power-down sequence may also be defined. The register interface for the power-down sequence is the same as that for the power-up sequence, except in one embodiment, there is a maximum of 36 sequence steps. If no power-down sequence is defined then the PRS defaults to first releasing SEQ_OUT_19 to the OPEN DRAIN HIGH state (Hi-Z) and then releasing the other sequence output pins to the OPEN DRAIN HIGH state (Hi-Z). In one embodiment, the power-down sequence is initiated by one of two conditions. A greater than 4 second pulse on the power button input pin, or double pulse on the power command input pin. The double pulse must be two pulses greater than 50 ms each with at least 20 ms in between, both occurring within 500 ms. However, these conditions are exemplary. Embodiments are well suited to a plurality of power-up and down initiation conditions. However, for purposes of brevity and clarity they are not described herein.

With reference now to FIG. 4, an exemplary physical arrangement 400 of the I2C bootloader framework that allows the firmware of the PRS to be updated over the I2C bus interface is shown. In general, the bootloader framework provides a known location for each component in the sequence. This update process for the physical arrangement table 4000 is described in detail in the Flash Update section herein.

With reference now to FIG. 5, an exemplary firmware interface table 500 is provided as a protocol for communicating with the PRS I2C slave device. The device I2C address is 0x86. A read request will begin at the current register pointer (set to 0x00 at power-up) and the register pointer value will not be affected by multi-byte reads or writes. To set the register pointer, write a message which contains the slave address followed by a single-byte pointer address, and that may be followed by any number of consecutive bytes to write. The value of the register pointer after a multi-byte write operation will remain the value set by the write operation. Any attempts to write a value to the read-only registers will result in no affect at that location but will begin writing if enough bytes are provided to reach a writeable register. Reading beyond the end of the registers will result in the last valid register value returned for every subsequent byte. Attempting to write beyond the end of the registers will result in that data being discarded.

In one embodiment, firmware interface 500 includes read-only status registers 510, writeable sequence registers 520, writeable sequence-down registers 530, writeable configuration registers 540, debug registers 550 and firmware update registers 560.

Referring still to FIG. 5, the Read-only Status Registers 510 includes a signature, the firmware revision and a progress/failure used for indicating the last sequence step successfully completed.

Referring still to FIG. 5, the writeable sequence registers 520 is an exemplary power-up register including a sequence ID, delay time 1, action time 1, action index 1, and sequence steps 240 (e.g., the total number of steps in one power-up sequence embodiment). Writeable sequence-down registers 530 is an exemplary power-down register including a sequence ID, delay time 1, action time 1, action index 1, and sequence steps 2-36 (e.g., the total number of steps in one power-down sequence embodiment). In general, the sequence ID is the first byte of a sequence. It may be used to validate that the sequence currently stored in the PRS is the desired sequence to use. In one embodiment, the sequence ID register will be set to 00 h until the first sequence is loaded over I2C.

The delay time register indicates the amount of time to wait before performing the action defined in the action type register (except in the case of a function call, as described below). In one embodiment, this delay is defined in 10 ms steps. For example, a delay time of 28 h will result in a delay of 10 ms*40=400 ms. The maximum amount of time available using this delay time in conjunction with a specific action is 10 ms*255=2.55 s.

If a greater delay is required before this action is taken, then a "Delay only" sequence step should be inserted into the sequence prior to the current sequence step. In the context of the "Delay Only" sequence the delay time register holds the lower byte and the action index register holds the upper byte of the delay time, which is defined in 1 ms steps (as opposed to 10 ms steps). The maximum amount of time available in each "Delay only" sequence step is 1 ms*65536=65.53 seconds.

If the action type is "Execute Function," then the delay time register is used as a parameter for the function call. Function calls may use this as an initial delay, or as any other byte of data that may need to be passed to the function.

The action type register defines the type of operation that is to be performed in this sequence step. Examples of the action type register are shown in table 6.

TABLE 6

| Action Type | Register Value | Description |
| --- | --- | --- |
| Strong Output Low | 00h | Drive the output pin electrically low |
| Strong Output High | 01h | Drive the output pin electrically high |
| Open Drain Low | 02h | Drive the output pin electrically low |
| Open Drain High | 03h | Sets the output pin to Hi-Z |
| Execute Function | 04h | Executes a predefined function |
| Delay Only | 05h | Waits for xxyy (hex) milliseconds; xx is the delay time register and yy is the action index register. The resolution is in milliseconds. |
| End-of-Sequence | 5E | End of Sequence marker |

The action index register indicates which item of the action type is to be executed. For example, action index 5 when applied to the "Strong Output High" action type will cause SEQ_OUT_5 to go to the electrically high state. When applied to the "Execute Function" action type, action index 5 will cause Function 5 to run. Action index when used with the "Delay Only" action type serves as an additional (upper) byte for the delay function. For example, if the delay time register contains 28 h and the action index register contains 05 h then the delay time is 0528 h.

Referring again to FIG. 5, the writeable configuration registers 540 provide some basic control over the PRS characteristics. In one embodiment, writeable configuration registers 540 includes a general configuration, an auto power-up delay, clock synthesizer settings and StoreSequence location. An exemplary generally configurations table 7 is shown below.

TABLE 7

| | | | Bit | | | | |
| --- | --- | --- | --- | --- | --- | --- | --- |
| 7 | 6 | 5 | 4 | 3 | 2 | 1 | 0 |
| Meaning | | | | | | | Output Initialization |

Output Initialization:
0 = Leave sequence output pins tri-stated
1 = Execute Power-down sequence at initialization If the AUTO_PWR_UP pin is sensed high when the PRS initializes, the Auto Power-Up Delay will delay the PRS such that the PRS will wait this period of time and then initiate the stored power-up sequence. The hexadecimal value in this register represents the number of seconds to wait before executing the power-up sequence.

Regarding the clock synth settings register, the PRS is designed to program a clock synthesizer with a serial shift register operation. An exemplary clock synth settings register is shown in table 8 below.

TABLE 8

| | Bit | | | |
| --- | --- | --- | --- | --- |
| 15:14 | 13 | 12:10 | 9:1 | 0 |
| Meaning Reserved | Invalid | N divider | M divider | SSC |

Referring to table 8, the lowest order bit (bit 0) indicates whether spread spectrum clocking (SSC) should be enabled (1) or disabled (0). Bits 9 to 1 hold the "M" divider ratio and bits 12 to 10 hold the "N" divider ratio for the clock synthesizer. These values are well known in the art and are normally provided in the standard clock synthesizer data sheet.

Bit 13 is defined as the Invalid bit. If set to 1, this bit indicates that the data read back from the clock synthesizer did not match the values in the clock synth settings register and the clock synth settings register now contains the values actually read back from the device. Although this bit is in a writeable register, this is a read-only bit. Any write to this register will result in the Invalid bit to be cleared. Reading this register does not clear this bit.

Writing 0xa55a to the store sequence register causes all the writeable registers (bytes 0x05 through 0xEF) to be stored in internal flash memory.

TABLE 9

| | | | | Bit | | | |
|---|---|---|---|---|---|---|---|
| 7 | 6 | 5 | 4 | 3 | 2 | 1 | 0 |
| Meaning | | | Force a Clock Synth Write (self-clears) | Force a Clock Synth Read (self-clears) | Enable (1) or Disable (0) checks | 1 = Execute Power Up Sequence (self-clears) | 1 = Execute Power Down Sequence (self-clears) |

Referring still to FIG. 5, the debug registers 550 enables and disables debug operations. One exemplary debug register is shown in table 9 herein for purposes of brevity and clarity. Therefore, in conjunction with the methods described herein, it is realized that the PRS code is updateable and thus new functions can be created and implemented without changing the hardware.

Thus, embodiments of the present invention provide methods and systems for utilizing a microcontroller to provide an automatic order and timing power and reset sequencer. Furthermore, embodiments provide a microcontroller PRS which is utilized to perform only the critical power up/down functions and no other non-critical tasks. Therefore, failure of the microcontroller is limited only to actual power up/down failures. Additionally, the order and timing of the signals is modifiable in a convenient and programmatic fashion without requiring component replacement, or significant reprogramming and redevelopment.

Embodiments of the present invention are thus described. While the present invention has been described in particular embodiments, it should be appreciated that the present invention should not be construed as limited by such embodiments, but rather construed according to the following claims.

We claim:

1. A method for utilizing a microcontroller to provide an automatic order and timing power and reset sequencer (PRS), said method comprising:
   accessing a first inter-integrated circuit (I2C) register table containing a modifiable system power-up sequence that specifies an order that a plurality of components for a system are to be powered-up in relationship to each other; and
   performing an automatic system power-up operation in the order of said power-up sequence defined by said first I2C register table, wherein a first component of said system is powered-up before a second component of said system based on said order of said power-up sequence, wherein said first I2C register table further provides support for a plurality of circuit components which need programming after power-up and before a system reset is released.

2. The method of claim 1 further comprising:
   accessing a second I2C register table containing a modifiable power-down sequence that specifies an order that said plurality of components are to be powered-down in relationship to each other; and
   performing an automatic system power-down operation in the order of said power-down sequence defined by said second I2C register table, wherein one of said components is powered-down before another of said components based on the order of said power-down sequence.

3. The method of claim 2 further comprising:
   utilizing an I2C interface coupled with said microcontroller to perform an automatic system power-up or power-down operation in the order of said Power-up or power-down sequence defined by said first I2C register table.

4. The method of claim 1 further comprising:
   storing said first I2C register table in a flash memory located on said microcontroller.

5. The method of claim 2 further comprising:
   storing said second I2C register table in a flash memory located on said microcontroller.

6. The method of claim 1 wherein said first I2C register table further comprises:
   providing a system power-up sequence update capability to said first I2C register table, wherein said first I2C register table is updated via standard I2C access methods.

7. The method of claim 2 wherein said second I2C register table further comprises:
   providing a system power-down sequence firmware update capability to said second I2C register table, wherein said second I2C register is updated via standard I2C access methods.

8. The method of claim 2 wherein said first I2C register table and said second I2C register table comprise:
   providing a component by component sequence for said plurality of components in said system; and
   providing a delay between any of said plurality of components in said component by component sequence.

9. The method of claim 1 wherein said plurality of circuit components selected from the group including a clock synthesizer update, programmable delay lines, voltage trip points, divider circuits, volatile control bits in registers, and work-a-rounds for very large scale integration (VLSI) bugs.

10. A power reset sequence microcontroller comprising:
    a flash storage coupled with said microcontroller;
    a first inter-integrated circuit (I2C) register table stored on said flash storage comprising a modifiable power-up sequence for a plurality of components in a system, wherein said modifiable power-up sequence specifies an order that said plurality of components are to be powered-up in relationship to each other; and an I2C interface coupled with said microcontroller, said I2C interface for accessing said power-on sequence and providing said power-up sequence to said microcontroller, wherein said microcontroller is configured for performing said power-up sequence automatically on said plurality of components in said system based on said power-up sequence stored at said first I2C register table, wherein said first I2C register table further provides support for a plurality of circuit components which need programming after power-up and before a system reset is released.

11. The microcontroller of claim 10 further comprising:
a second I2C register table stored on said flash storage comprising a modifiable power-off order, wherein said I2C interface provides said power-off order to said microcontroller and wherein said microcontroller performs a sequencing of a system power down based on said power-off order stored on said second I2C register table, wherein said modifiable power-off order specifies that one of said components is to be powered-off before another of said components.

12. The microcontroller of claim 10 wherein said first I2C register table further comprises:
a system power-up sequence update capability for updating said first I2C register table.

13. The microcontroller of claim 12 wherein said first I2C register table is updated via standard I2C access methods.

14. The microcontroller of claim 11 wherein said second I2C register table further comprises:
a system power-down sequence firmware update capability for updating said second I2C register table.

15. The microcontroller of claim 14 wherein said second I2C register table is updated via standard I2C access methods.

16. The microcontroller of claim 11 wherein said first I2C register table and said second I2C register table comprise:
a component by component sequence for said plurality of components in said system;
a delay provider for providing a delay between any of said plurality of components in said component by component sequence; and
a clock synthesizer update for updating a clock synthesizer during said power-up sequence.

17. A computer-readable storage medium having computer-readable program code embodied thereon for causing a method for utilizing a microcontroller to provide an automatic order and timing power and reset sequencer (PRS), said method comprising:
accessing a first inter-integrated circuit (I2C) register table containing a modifiable system power-up sequence that specifies an order that a plurality of components for a system are to be powered-up in relationship to each other;
utilizing an I2C interface coupled with said microcontroller to perform an automatic system power-up operation in the order of said power-up sequence defined by said first I2C register table, wherein said first inter-integrated circuit (I2C) register table further provides support for a plurality of circuit components which need programming after power-up and before a system reset is released;
accessing a second I2C register table containing a modifiable power-down sequence that specifies an order that said plurality of components are to be powered-down in relationship to each other; and
utilizing said I2C interface coupled with said microcontroller to perform an automatic system power-down operation in the order of said power-down sequence defined by said second I2C register table.

18. The computer-readable storage medium of claim 17 further comprising:
storing said first I2C register table in a flash memory located on said microcontroller.

19. The comDuter-readable storage medium of claim 17 further comprising:
storing said second I2C register table in a flash memory located on said microcontroller.

20. The computer-readable storage medium of claim 17 wherein said first inter-integrated circuit (I2C) register table further comprises:
providing a system power-up sequence update capability to said first I2C register table, wherein said first I2C register table is updated via standard I2C access methods.

21. The comDuter-readable storage medium of claim 17 wherein said second inter-integrated circuit (I2C) register table further comprises:
providing a system power-down sequence firmware update capability to said second I2C register table, wherein said second I2C register table is updated via standard I2C access methods.

22. The comDuter-readable storage medium of claim 17 wherein said first I2C register table and said second I2C register table comprise:
providing a component by component sequence for said plurality of components in said system; and
providing a delay between at least one of said plurality of components in said component by component sequence.

23. The computer-readable storage medium of claim 17 wherein said first I2C register table further comprises:
providing a clock synthesizer update for updating said clock synthesizer during said power-up sequence.

* * * * *

UNITED STATES PATENT AND TRADEMARK OFFICE
CERTIFICATE OF CORRECTION

PATENT NO. : 7,613,937 B2 Page 1 of 1
APPLICATION NO. : 11/263433
DATED : November 3, 2009
INVENTOR(S) : Kevin Boyum et al.

It is certified that error appears in the above-identified patent and that said Letters Patent is hereby corrected as shown below:

In column 10, line 48, in Claim 7, after "register" insert -- table --.

In column 12, line 21, in Claim 19, delete "comDuter" and insert -- computer --, therefor.

In column 12, line 32, in Claim 21, delete "comDuter" and insert -- computer --, therefor.

In column 12, line 39, in Claim 22, delete "comDuter" and insert -- computer --, therefor.

Signed and Sealed this

Twentieth Day of April, 2010

David J. Kappos
*Director of the United States Patent and Trademark Office*